(12) United States Patent
Totani et al.

(10) Patent No.: US 12,011,898 B2
(45) Date of Patent: Jun. 18, 2024

(54) BAG MAKING METHOD

(71) Applicant: Totani Corporation, Kyoto (JP)

(72) Inventors: Mikio Totani, Kyoto (JP); Hiroshi Nagata, Kyoto (JP); Tatsuo Odani, Kyoto (JP)

(73) Assignee: Totani Corporation, Kyoto (JP)

( * ) Notice: Subject to any disclaimer, the term of this patent is extended or adjusted under 35 U.S.C. 154(b) by 47 days.

(21) Appl. No.: 18/013,540

(22) PCT Filed: May 19, 2021

(86) PCT No.: PCT/JP2021/019009
§ 371 (c)(1),
(2) Date: Dec. 28, 2022

(87) PCT Pub. No.: WO2022/018948
PCT Pub. Date: Jan. 27, 2022

(65) Prior Publication Data
US 2023/0256698 A1   Aug. 17, 2023

(30) Foreign Application Priority Data

Jul. 20, 2020   (JP) ................................. 2020-123841

(51) Int. Cl.
| | |
|---|---|
| *B31B 70/64* | (2017.01) |
| *B31B 70/16* | (2017.01) |
| *B31B 70/26* | (2017.01) |
| *B65D 33/25* | (2006.01) |
| *B31B 155/00* | (2017.01) |
| *B31B 160/20* | (2017.01) |

(52) U.S. Cl.
CPC ............ *B31B 70/644* (2017.08); *B31B 70/16* (2017.08); *B31B 70/266* (2017.08); *B65D 33/25* (2013.01); *B31B 2155/001* (2017.08); *B31B 2160/20* (2017.08); *B65D 2207/00* (2013.01)

(58) Field of Classification Search
None
See application file for complete search history.

(56) References Cited

U.S. PATENT DOCUMENTS

| | | | | |
|---|---|---|---|---|
| 4,572,753 | A * | 2/1986 | Bach ....................... | B29C 66/43 |
| | | | | 156/580.2 |
| 8,414,465 | B2 * | 4/2013 | Totani .................... | B65D 31/10 |
| | | | | 493/243 |
| 2017/0173913 | A1 * | 6/2017 | Totani .................... | B31B 50/26 |
| 2019/0375166 | A1 * | 12/2019 | De Cuyper ....... | B29C 66/81433 |

FOREIGN PATENT DOCUMENTS

| | | |
|---|---|---|
| JP | S61502666 | 11/1986 |
| JP | 2014049197 | 3/2014 |
| JP | 2015013390 | 1/2015 |
| JP | 2017217764 | 12/2017 |
| JP | 2018140519 | 9/2018 |
| JP | 6537979 | 7/2019 |
| JP | 2019533591 | 11/2019 |

\* cited by examiner

*Primary Examiner* — Tanzim Imam
(74) *Attorney, Agent, or Firm* — JCIPRNET (57) ABSTRACT

At least one of a horn or an anvil includes protrusions that protrude from a facing surface thereof. Two panel parts and a gusset part folded and interposed between the panel parts are sandwiched and compressed by the horn and the anvil. Two portions of the gusset part are welded to each other by ultrasonic vibration of the horn during the sandwiching and compressing.

9 Claims, 12 Drawing Sheets

□ : Distal end positions of the anvil's protrusions
○ : Distal end positions of the horn's protrusions

BAG MAKING METHOD

CROSS-REFERENCE TO RELATED APPLICATION

This application is a 371 application of an international PCT application serial no. PCT/JP2021/019009, filed on May 19, 2021, which claims the priority benefit of Japan application no. 2020-123841, filed on Jul. 20, 2020. The entirety of each of the above-mentioned patent applications is hereby incorporated by reference herein and made a part of this specification.

TECHNICAL FIELD

The present application relates to a bag making method and a welding method including welding two portions of a gusset part to each other, the gusset part being folded and interposed between two panel parts.

BACKGROUND

For example, a bag such as a plastic bag and a pouch includes two panel parts facing each other. The bag includes a gusset part folded and interposed between the panel parts in order to expand its capacity or to obtain self-standability.

For example, the gusset part may be a side gusset part, a bottom gusset part or a top gusset part. The gusset part is sectioned into two portions by a folded edge thereof. For example, these two portions may be welded to each other at the ends of the bag in order to prevent the bag from being excessively expanded or to enhance the self-standability of the bag. The reason to enhance the self-standability of the bag is that when the bag is placed on a placement surface, the opposite edges of the gusset part (bottom gusset part) constitute a contact part between the bag and the placement surface, wherein when the bag is filled with contents, the edges each contact with the placement surface as an outer circumferential edge of a region having a predetermined area instead of a straight line.

Patent document 1 discloses a method for ultrasonic-welding the two portions of the gusset part to each other. The method in Patent document 1 brings a horn into contact with one panel part, brings an anvil into contact with the other panel part, sandwiches and compresses two panel parts and the gusset part folded and interposed between the panel parts, with the horn and the anvil. The method then welds the two portions of the gusset part to each other using the ultrasonic vibration of the horn.

In performing such ultrasonic-welding, the panel parts located between the horn/anvil and the gusset part are a factor to cause the decrease in the transfer efficiency of vibrational energy from the horn to a spot to be welded. Therefore, the two portions of the gusset part may fail to be welded tightly to each other.

The present application provides a bag making method and a welding method for efficiently welding two portions of a gusset part.

CITATION LIST

Patent Document

Patent document 1: JPA 6537979B2

SUMMARY

According to an aspect of the present application, there is provided a bag making method, the bag making method including: folding a web to form a continuous first panel part, a continuous second panel part and a continuous gusset part from the web, the gusset part being folded and interposed between the first and second panel parts; sandwiching and compressing the first panel part, the second panel part and the gusset part folded and interposed between the first and second panel parts, with a horn and an anvil, the horn having a facing surface that faces the anvil, the anvil having a facing surface that faces the horn, at least one of the horn or the anvil including protrusions that protrude from the facing surface thereof; welding a first portion and a second portion of the gusset part to each other using ultrasonic vibration of the horn while the first panel part, the second panel part and the gusset part are sandwiched and compressed by the horn and the anvil; and cross-cutting the web in a width direction of the web across an ultrasonic-welded region where the first portion and the second portion have been ultrasonic-welded to each other by the horn and the anvil, so as to make a bag.

The bag making method may include making the bag including the ultrasonic-welded region having a longer length on an inward side thereof than a length on an outward side thereof.

The bag making method may include making the bag including the ultrasonic-welded region having a trapezoidal shape that narrows toward an outside of the bag.

The bag making method may include making the bag including the gusset part as a bottom gusset part.

The bag making method may include making the bag having marks of the protrusions, the marks being generated during ultrasonic-welding with the horn and the anvil.

According to another aspect of the present application, there is provided a welding method for ultrasonic-welding a first portion and a second portion of a gusset part to each other, the gusset part being folded and interposed between a first panel part and a second panel part, the welding method including: sandwiching and compressing the first panel part, the second panel part and the gusset part folded and interposed between the first and second panel parts, with a horn and an anvil, the horn having a facing surface that faces the anvil, the anvil having a facing surface that faces the horn, at least one of the horn or the anvil including protrusions that protrude from the facing surface thereof; and welding the first portion and the second portion to each other using ultrasonic vibration of the horn while the first panel part, the second panel part and the gusset part are sandwiched and compressed by the horn and the anvil.

Each of the protrusions may have a pointed shape. The welding method may include thrusting the protrusions into the first or second panel part and the gusset part such that the protrusions penetrate through the first or second panel part, as the first panel part, the second panel part and the gusset part are sandwiched and compressed by the horn and the anvil.

The welding method may include thrusting the protrusions into the first panel part, the second panel part, the first portion and the second portion such that the protrusions penetrate through the first panel part, the first portion and the second portion, as the first panel part, the second panel part and the gusset part are sandwiched and compressed by the horn and the anvil.

Each of the protrusions may have a flat distal end. The welding method may include sinking the protrusions into a layered portion constituted by the first panel part, the second panel part, the first portion and the second portion, as the first panel part, the second panel part and the gusset part are sandwiched and compressed by the horn and the anvil.

Each of the first panel part, the second panel part and the gusset part is a laminated film including a base layer composed of base material and a sealant layer composed of sealant having a lower melting point than the base material. The welding method may include melting the sealant using the ultrasonic vibration of the horn to integrally weld the first panel part, the second panel part, the first portion and the second portion via the sealant.

The welding method may include folding a web to form the first panel part, the second panel part and the gusset part from the web. Here, the first panel part, the second panel part and the gusset part may be continuous and be integrally formed.

The first panel part, the second panel part and the gusset part may be separate components.

The protrusions may be disposed on both of the facing surface of the horn and the facing surface of the anvil. The protrusions of the horn and the protrusions of the anvil may be arranged so as to be offset from each other in a direction perpendicular to a facing direction of the horn and the anvil such that distal ends of the protrusions of the horn and distal ends of the protrusions of the anvil do not face each other.

DETAILED DESCRIPTION

Implementations of the present application will be described below with reference to the drawings.

Figure 1A:
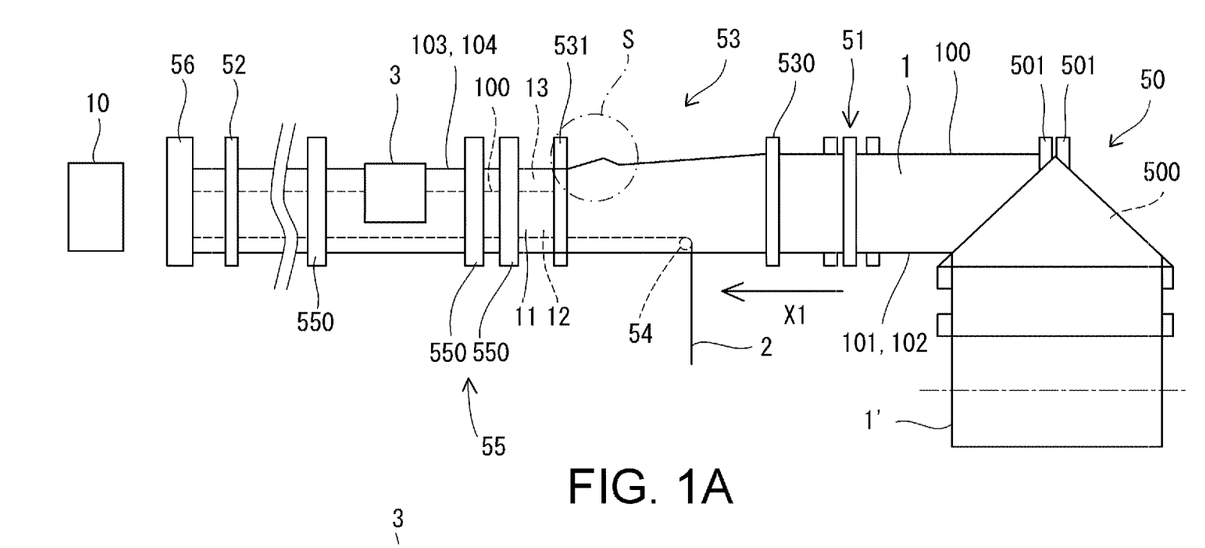
FIG. 1A is a schematic plan view of an example bag making apparatus.
Figure 1B:
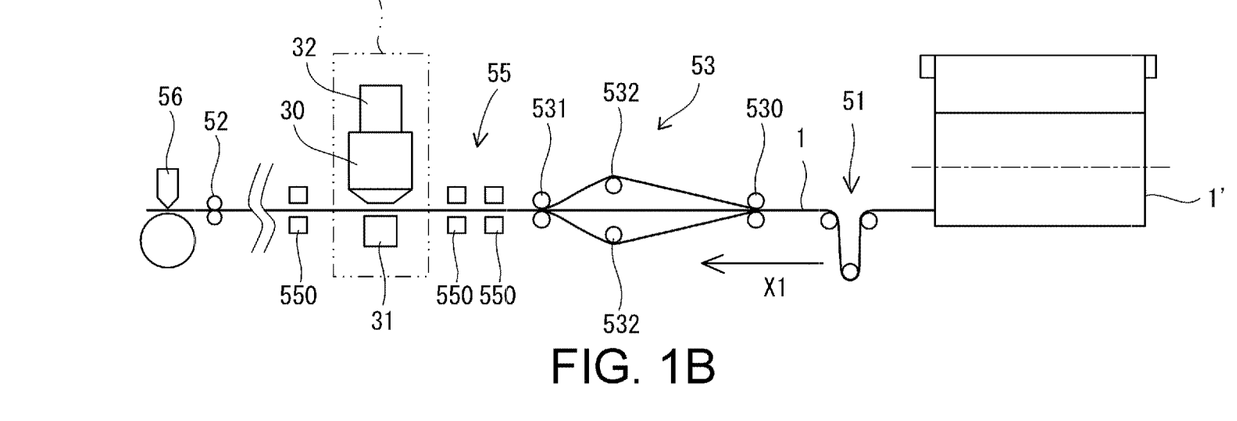
FIG. 1B is a front view of FIG. 1A.
Figure 1C:
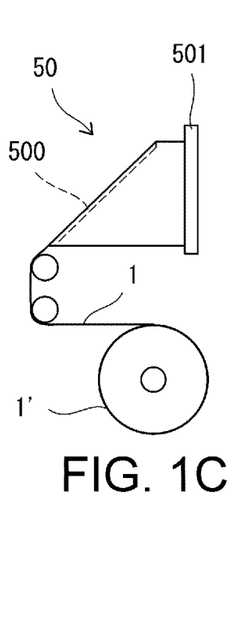
FIG. 1C is a side view of FIG. 1A.

An example bag making apparatus is illustrated in FIG. 1A to FIG. 1C. Bags 10 (FIG. 1A) are successively made by the bag making apparatus. A web 1 is continuously unrolled from an original roll 1' at a constant speed in its longitudinal direction (its continuous direction), and folded in half by a first folding device 50. The first folding device 50 includes a triangular plate 500 and a pair of suction rollers 501. As the web 1 is fed, it is folded in half along its longitudinal centerline by the triangular plate 500 and the suction rollers 501. A reference numeral 100 in FIG. 1A designates a folded edge resulting from folding the web 1 in half. Reference numerals 101 and 102 in FIG. 1A designate the opposite side edges of the web 1 aligned with each other as a result of folding the web 1 in half.

The web 1 folded in half is then appropriately switched from continuous feed to intermittent feed by a dancer device 51 including a dancer roller. A feed device 52 including a pair of feed rollers is disposed in a downstream section of the bag making apparatus, and intermittently feeds the web 1 in the longitudinal direction of the web 1. The feed direction of the web 1 is designated by a reference sign Xl.

The web 1 is then further folded by a second folding device 53 such that two continuous panel parts 11 and 12 and a continuous gusset part 13 folded and interposed between the panel parts 11 and 12 are formed from the web 1.

The second folding device 53 includes a pair of expansion rollers 532 (FIG. 1B) arranged downstream of a pair of guide rollers 530 and upstream of a pair of guide rollers 531. The web 1 is expanded in the zone from the guide rollers 530 to the guide rollers 531 by the expansion rollers 532, so that a space is created between the two layers of the web 1.

Figure 2A:
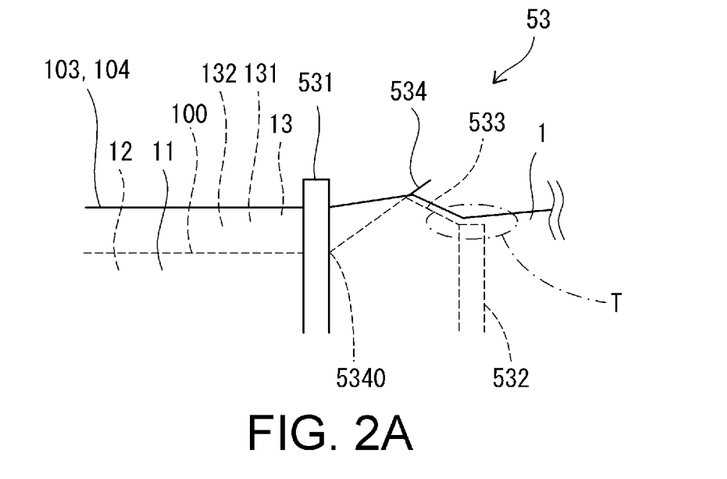
FIG. 2A is an enlarged plan view of a region S in FIG. 1A.
Figure 2B:
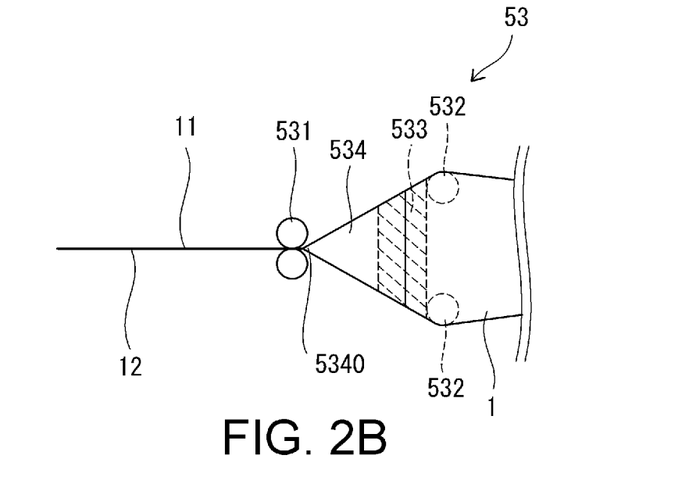
FIG. 2B is a back view of FIG. 2A.

As illustrated in FIG. 2A and FIG. 2B, the second folding device 53 further includes a first formation plate 533 disposed immediately downstream of the expansion rollers 532 and a second formation plate 534 disposed immediately downstream of the first formation plate 533.

The first formation plate 533 has a trapezoidal shape. The first formation plate 533 is arranged in the space formed by the expansion rollers 532, so as to contact with a portion of the web 1 including the folding edge 100 from the inside of the web 1. The first formation plate 533 is oriented so as to narrow downstream.

The second formation plate 534 has a triangular shape. The second formation plate 534 is arranged so as to contact with the portion including the folding edge 100 from the outside. The second formation plate 534 narrows downstream toward the web 1, and one apex 5340 (FIG. 2B) thereof, which is a downstream end of the second formation plate 534, enters in the web 1, and contacts with the folding edge 100 of the web 1 near the guide rollers 531.

As the web 1 is fed, the portion including the folding edge 100 is guided to the second formation plate 534 in a state of being expanded by the first formation plate 533, and then folded back in the opposite direction along the folded edge 100 by the second formation plate 534 to enter between the two layers of the web 1. Then, in this state, the web 1 is fed through the pair of guide rollers 531.

This causes the portion including the folding edge 100 to be folded and interposed between the two layers of the web 1, so that it results in the continuous gusset part 13, and that the two layers of the web 1 result in the two continuous panel parts 11 and 12. The folded edge 100 results in an inner edge of the gusset part 13. The gusset part 13 is sectioned into two portions 131 and 132 (see FIG. 4) by the inner edge 100 thereof. Reference numerals 103 and 104 in FIG. 2A designate the outer edges of the gusset part 13 each of which is also a border edge between the gusset part 13 and the panel part 11 or 12. Thereafter, the web 1 is fed in a state of being folded in this way.

Figure 2C:
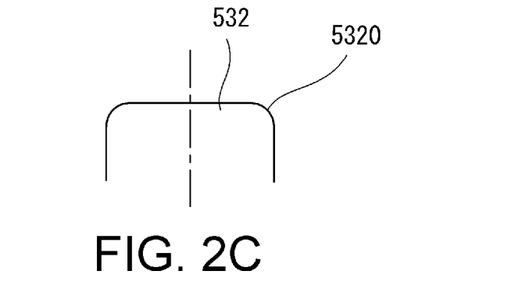
FIG. 2C is a partial plan view of an expansion roller at a region T in FIG. 2A.

The entering length of the apex 5340 of the second formation plate 534 into the web 1 is the interposed length of the folded gusset part 13. FIG. 2C illustrates an enlarged view of the expansion roller 532 in the region T of FIG. 2A. As illustrated in FIG. 2C, each expansion roller 532 may include an R-shaped end part 5320. Furthermore, the end part 5320 may be located on a side on which the web 1 is folded, so as to contact with the inner surface of the web 1, thereby preventing the web 1 from being damaged.

As illustrated in FIG. 1A and FIG. 1B, a continuous strip member 2 (FIG. 1A) may be inserted between the two layers (namely, the panel parts 11 and 12) of the web 1 through a space obtained by the expansion rollers 532. The strip member 2 in the implementation may be a component that allows the bag 10 to be opened and closed repeatedly, and specifically, be a zipper including a male member and a female member that are configured to be detachably engaged with each other. The zipper 2 is guided, diverted, and inserted between the panel parts 11 and 12 by a guide roller 54 with the male member and the female member engaged with each other.

The zipper 2 may be irradiated with a laser by a laser device (not illustrated) to be welded to the panel parts 11 and 12 after it is inserted between the panel parts 11 and 12. Thus, the male member may be irradiated with the laser to be welded to the inner surface of the panel part 11/12, and the female member may be irradiated with the laser to be welded to the inner surface of the panel part 12/11. The laser device for welding may be, for example, a laser device disclosed in JPA 2017-47622. Instead of the laser method, a heat seal method may be employed.

The complicated configuration of the bag increases steps of incorporating or forming additional components such as the strip member, the gusset part, and a spout. Consequently, this leads to the complication of the whole bag making step and a concern of the decrease in bag making speed. For an appropriate improvement of the speed, it is important to achieve a balance such that a particular step is not a bottleneck. For example, in the case of bag making that includes a step of welding the zipper 2 using the heat seal method, if the step of welding the zipper 2 using the heat seal method is a bottleneck, the laser method is employed for the welding of the zipper 2 similarly to the present implementation in order to improve the bag making speed.

After the formation of the panel parts 11 and 12 and the gusset part 13, the web 1 is heat-sealed in the width direction of the web 1 by a heat seal device 55 during every intermittent feed cycle of the web 1. Thereby, a region 14 (not illustrated in FIG. 1A; see FIG. 3) (hereinafter, referred to as a heat-sealed region) that has been heat-sealed is generated in the web 1 at a pitch corresponding to the width of the bag 10. The heat seal device 55 may include a plurality of seal units 550. In the implementation, three seal units 550 are provided each of which includes a pair of heated heat seal bars.

The number of seal units 550 may be determined based on characteristics such as the bag making speed. The plurality of seal units 550 may heat-seal an identical area in sequence to provide a high-quality heat seal at a high speed, or may heat-seal different areas.

Figure 4:
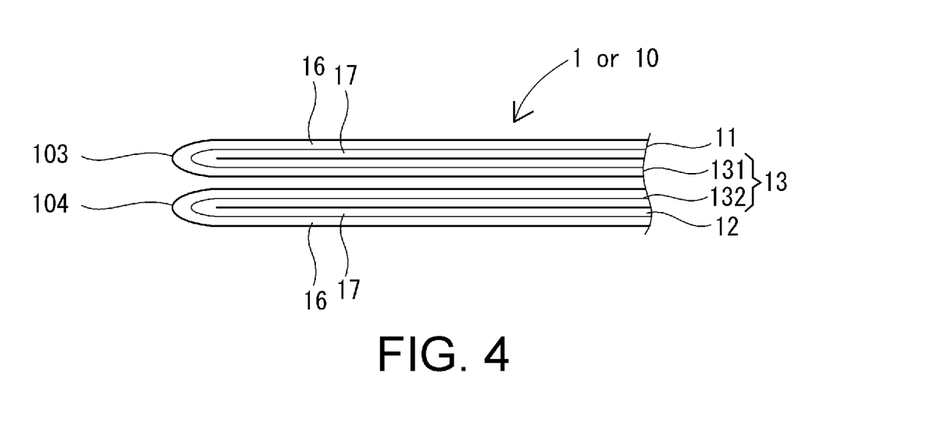
FIG. 4 is a sectional view of a folded laminated film.

As illustrated in FIG. 4, the web 1 in the implementation is a laminated film including a base layer 16 composed of base material and a sealant layer 17 composed of sealant having a lower melting point than the base material. For example, the base material may be nylon, PET or the like. For example, the sealant may be polyethylene, polypropylene or the like. A first surface of the web 1 is formed by the base layer 16, and a second surface of the web 1 is formed by the sealant layer 17.

The web 1 is folded by the folding devices 50 and 53 such that the outer surface of the web 1 (namely, the outer surface of each of the panel parts 11 and 12 and the gusset part 13) is formed by the base layer 16, and the inner surface of the web 1 (namely, the inner surface of each of the panel parts 11 and 12 and the gusset part 13) is formed by the sealant layer 17. Heat-sealing is performed utilizing the melting of the sealant of the sealant layer 17.

Accordingly, the heat seal device 55 heat-seals the panel parts 11 and 12 to each other in a region where they do not sandwich the gusset part 13, heat-seals the panel part 11 and the gusset part 13 (portion 131) to each other, and heat-seals the panel part 12 and the gusset part 13 (portion 132) to each other. On the other hand, the portions 131 and 132 of the gusset part 13 fail to be heat-sealed to each other by the heat seal device 55, since their outer surfaces (facing surfaces) are formed by the base layer 16.

The portions 131 and 132 are ultrasonic-welded to each other by the ultrasonic welding device 3 during every intermittent feed cycle of the web 1. Thereby, a region 15 (not illustrated in FIG. 1A; see FIG. 3) (hereinafter, referred to as an ultrasonic-welded region) that has been ultrasonic-welded is generated in the web 1 at a pitch corresponding to the width of the bag 10. In the implementation, the ultrasonic-welded region 15 is contained within the heat-sealed region 14.

The ultrasonic welding device 3 in the implementation is arranged downstream of two seal units 550 and upstream of one seal unit 550. An identical area of the web 1 is heat-sealed twice by the two seal units 550 disposed upstream of the ultrasonic welding device 3, which thereby softens the panel parts 11 and 12 and the gusset part 13. The ultrasonic welding device 3 ultrasonic-welds the panel parts 11 and 12 and the gusset part 13 which are in a state of being softened and loosely adhered. The ultrasonic welding device 3 and a welding method using this will be described later in detail.

The position of the ultrasonic welding device 3 relative to the heat seal device 55 (seal units 550) is arbitrary, and may be appropriately determined depending on the material quality of the web 1 (bag 10), the purpose of the welding, and the like. Also, the order of ultrasonic-welding and heat-sealing may be appropriately determined depending on the material quality of the web 1 (bag 10), the purpose of the welding, and the like.

After heat-sealing and ultrasonic-welding, the web 1 and the zipper 2 are cross-cut in the width direction of the web 1 across the ultrasonic-welded region 15 at the position of the heat-sealed region 14 during every intermittent feed cycle of the web 1, by a cross cut device 56 including a cutter, a receiving stage and so on. Thereby, the bags 10 are successively made.

Figure 3:
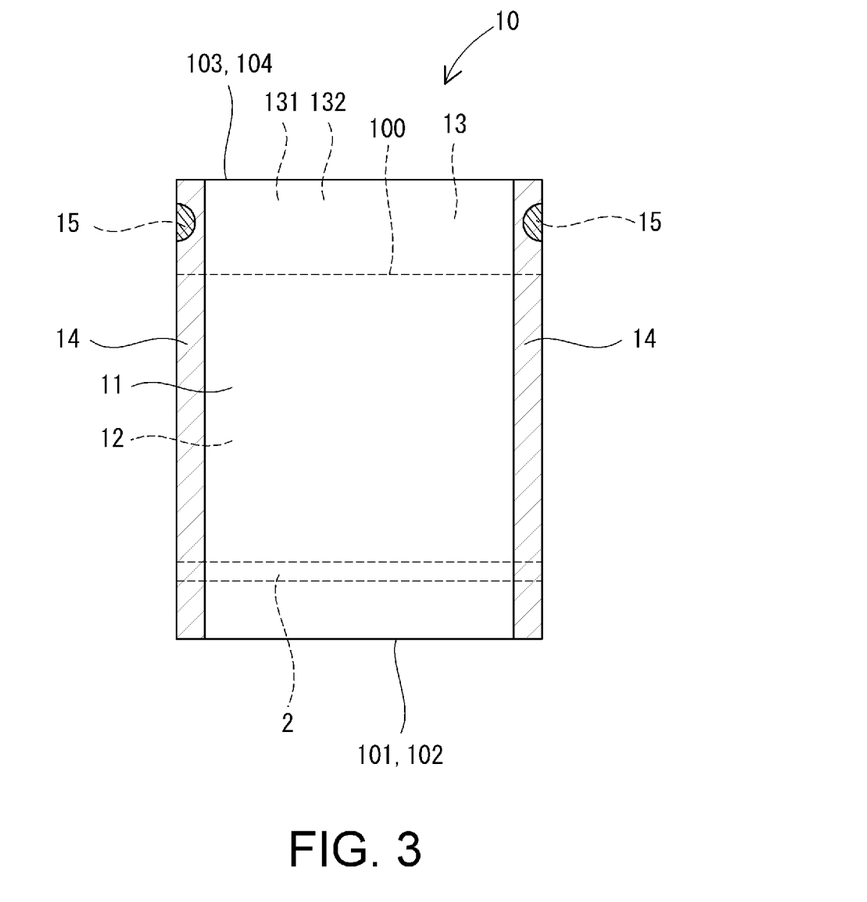
FIG. 3 is a diagram illustrating a bag in FIG. 1A in detail.

FIG. 3 is an enlarged view of the bag 10 in FIG. 1A. The bag 10 can be repeatedly opened and closed with the zipper 2. The panel parts 11 and 12 and the gusset part 13 are integrally formed from a single sheet cut off from the web 1. The opening of the bag 10 is defined by the edges 101 and 102. The gusset part 13 functions as a bottom gusset part. The regions 14 and 15 are located on the opposite sides of the bag 10 since each of the regions is divided into two by cross-cutting.

The ultrasonic welding device 3 and a method for ultrasonic-welding the portions 131 and 132 of the gusset part 13 to each other using this device 3 will be described below.

As illustrated in FIG. 1B, the ultrasonic welding device 3 includes a horn 30 and an anvil 31 that are located to face each other. The ultrasonic welding device 3 further includes a drive device 32 configured to move the horn 30 towards and away from the anvil 31, and to ultrasonic-vibrate the horn 30. The horn 30 and the anvil 31 vertically face each other with the web 1 which is being intermittently fed interposed therebetween. Specifically, the horn 30 and the anvil 31 face each other with the panel parts 11 and 12 and the gusset part 13 (which has been folded and interposed between them) interposed therebetween.

The horn 30 is moved towards the anvil 31 by the drive device 32, so that the panel parts 11 and 12 and the gusset part 13 are sandwiched and compressed by the horn 30 and the anvil 31. During this sandwiching and compressing, the horn 30 is vibrated at a high frequency by the drive device 32. The energy of the ultrasonic vibration is transferred to a spot to be welded (hereinafter, referred to as a target spot), and is converted into frictional heat at the target spot. The components are then welded to each other at the target spot due to the temperature increased by the frictional heat. Specifically, in the case where the gusset part 13 is composed of mono-material such as polyethylene, the facing surfaces of the portions 131 and 132 are welded to each other. On the other hand, in the case where the gusset part 13 is a laminated film having the portions 131 and 132 with the facing surfaces formed by the base layer, the base layer is broken by later-described protrusions 311 of the anvil 31 and/or protrusions 301 of the horn 30 (see FIG. 5A, FIG. 7A, FIG. 8A, etc.) to cause the sealant layer of the laminated film to melt and then flow out, so that the facing surfaces of the portions 131 and 132 are substantially welded to each other.

Ultrasonic welding conditions including frequency, amplitude, vibration time, welding pressure and the like are appropriately selected depending on the material of the portions 131 and 132 to be welded, welding strength required, and the like.

Figure 5A:
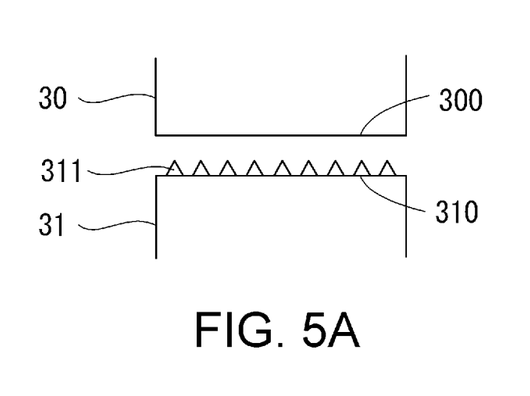
FIG. 5A illustrates an example horn and an example anvil.

As illustrated in FIG. 5A, the horn 30 has a flat facing surface 300 that faces the anvil 31. The anvil 31 has a flat facing surface 310 that faces the horn 30, and includes a plurality of protrusions 311 that protrudes from the facing surface 310.

Figure 5B:
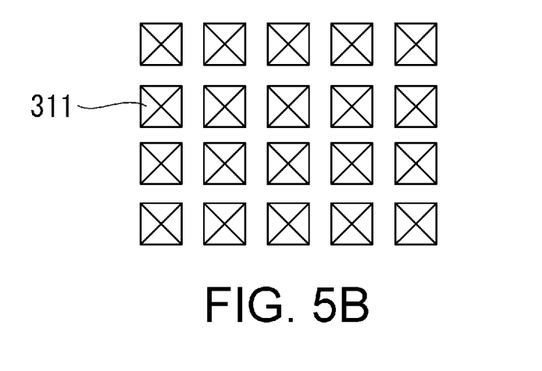
FIG. 5B illustrates an example array of protrusions in FIG. 5A.

Each of the protrusions 311 may have a pointed shape. The protrusions 311 may be arrayed two-dimensionally as illustrated in FIG. 5B, which is a plan view.

Figure 6A:
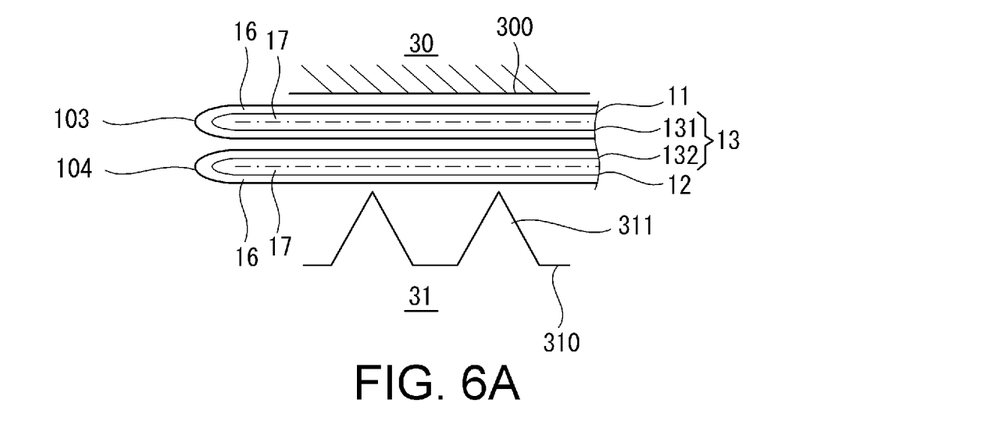
FIG. 6A to FIG. 6C illustrate an example of ultrasonic-welding.
Figure 6B:
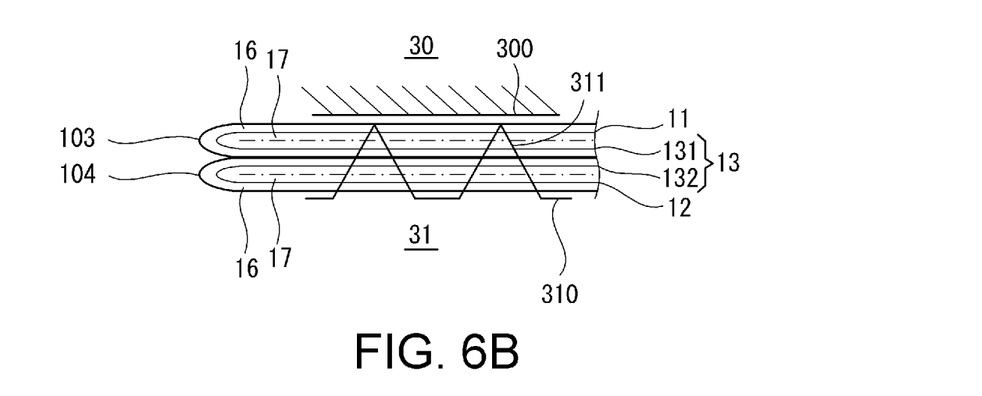

As illustrated in FIG. 6A and FIG. 6B, as the panel parts 11 and 12 and the gusset part 13 are sandwiched and compressed by the horn 30 and the anvil 31, the protrusions 311 penetrate at least the base layer 16 on the outer side of the web 1, and enter the sealant layer 17 on the inner side. More specifically, the protrusions 311 are thrusted into the panel parts 11 and 12 and the portions 131 and 132 of the gusset part 13 until the protrusions 311 reach the panel part 11 on the opposite side penetrating through the panel part 12 and the portions 131 and 132. In this state, the horn 30 is then ultrasonic-vibrated. This ultrasonic vibration causes the portions 131 and 132 to be ultrasonic-welded to each other as illustrated in FIG. 6C.

The protrusions 311 has entered a layered portion constituted by the panel parts 11 and 12 and the gusset part 13, which shortens the distance between the horn 30 and the anvil 31 and thus the distance between the horn 30/anvil 31 and the target spot. This causes vibrational energy to be efficiently transferred to the target spot, and thus the temperature of the target spot to rise in a short time. Therefore, the efficiency of the ultrasonic welding is improved by the protrusions 311.

As described above, heat-sealing performed by the seal units 550 before ultra-welding softens the web 1 (base layer 16 thereof). This facilitates the entering of, specifically thrusting of the protrusions 311 into the web 1.

Figure 6C:
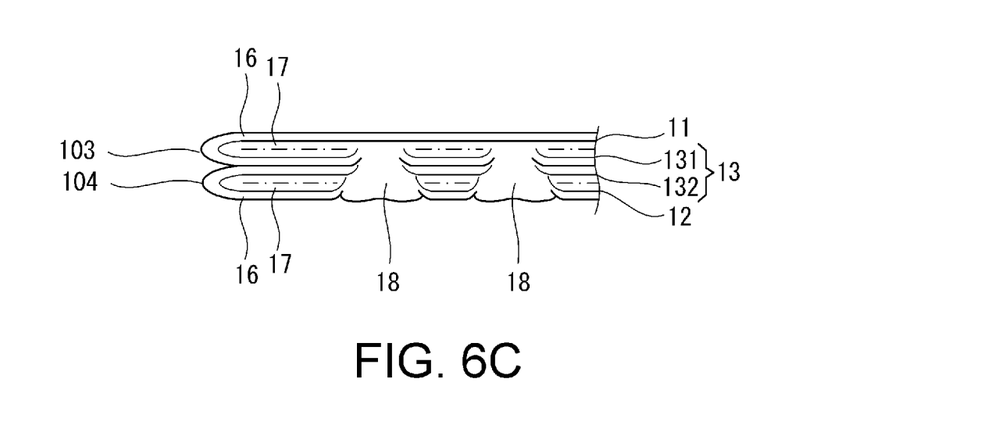

In the case of a laminated film like the one used in the implementation, since the protrusions 311 have penetrated through the base layer 16, the sealant of the sealant layer 17 melts due to the ultrasonic vibration of the horn 30, and flows into each of through-holes of the base layer 16 to be filled into the through-holes, so that filling parts 18 of the sealant are generated as illustrated in FIG. 6C. The panel parts 11 and 12 and the portions 131 and 132 are integrally welded via the filling parts 18, resulting in the improved welding strength of the ultrasonic-welded region 15.

Subsequent to ultrasonic-welding, the bag making method in FIG. 1 performs heat-sealing again using the downstream seal unit 500 in the heat-sealed region 14 that contains the ultrasonic-welded region 15 therein. At this time, heat-sealing the sealant layers 17 to each other is completed. In addition, the sealant seeping in the ultrasonic-welded region 15 (namely the filling parts 18 of the sealant) is further heated, which allows for providing the smooth and high-quality finish of the sealed surfaces, although marks of the protrusions 311 remain on the web 1, that is, on the bag 10.

Figure 7A:
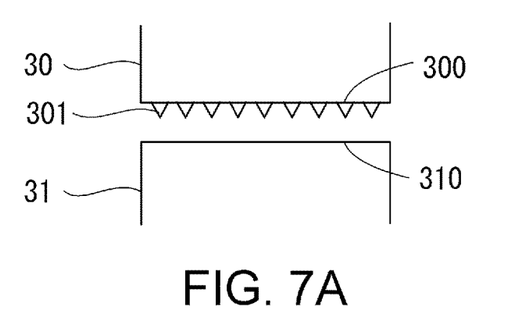
FIG. 7A illustrates another example horn and another example anvil.
Figure 7B:
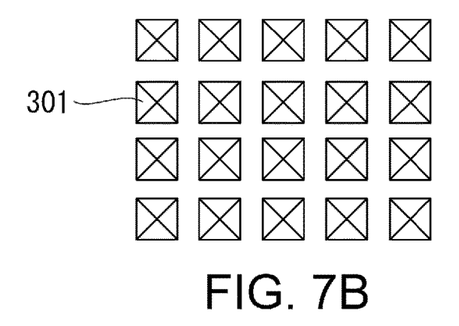
FIG. 7B illustrates another example array of protrusions in FIG. 7A.

As illustrated in FIG. 7A and FIG. 7B, a plurality of protrusions 301 may be arrayed two-dimensionally to protrude from the facing surface 300 of the horn 30, instead of the facing surface 310 of the anvil 31. This also can achieve the above effect.

Figure 8A:
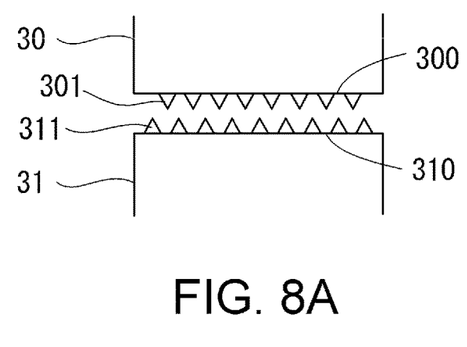
FIG. 8A illustrates another example horn and another example anvil.
Figure 8B:
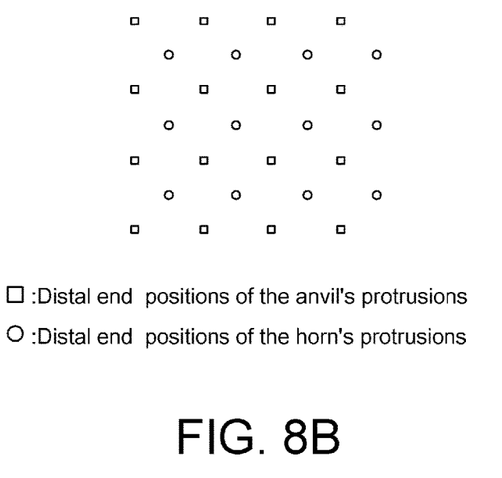
FIG. 8B illustrates a positional relationship between distal ends of horn's protrusions and distal ends of anvil's protrusions.

As illustrated in FIG. 8A and FIG. 8B, both of the horn 30 and the anvil 31 may include the protrusions 301 and 311. Here, as illustrated in FIG. 8B, the protrusions 301 of the horn 30 and the protrusions 311 of the anvil 31 are arranged to be offset from each other in a direction perpendicular to their facing direction such that their distal ends do not face each other.

Figure 9A:
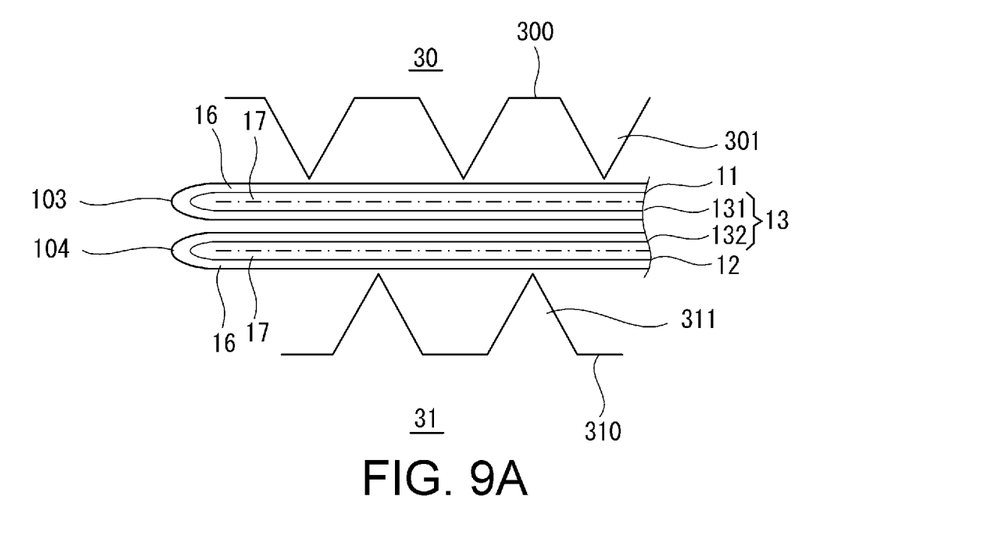
FIG. 9A and FIG. 9B illustrate another example of ultrasonic-welding.
Figure 9B:
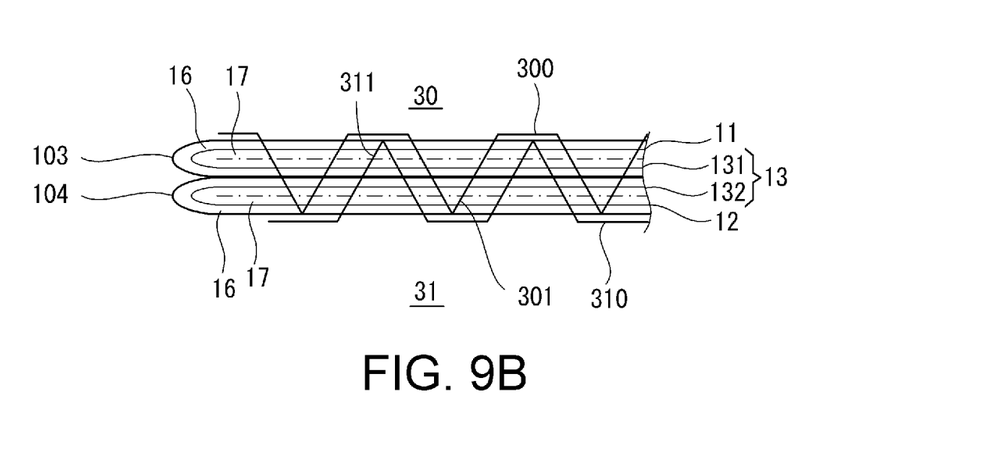

Moreover, as illustrated in FIG. 9A and FIG. 9B, as the panel parts 11 and 12 and the gusset part 13 are sandwiched and compressed by the horn 30 and the anvil 31, the protrusions 301/311 are thrusted into the panel parts 11 and 12 and the portions 131 and 132 of the gusset part 13 until the protrusions 301/311 reach the panel part 12/11 on the opposite side penetrating through the panel part 11/12 and the portions 131 and 132. Then, ultrasonic-welding is performed by the ultrasonic vibration of the horn 30 during this sandwiching and compressing.

Since both of the horn 30 and the anvil 31 include the protrusions 301 and 311, it is possible to perform more efficient ultrasonic welding.

Figure 10A:
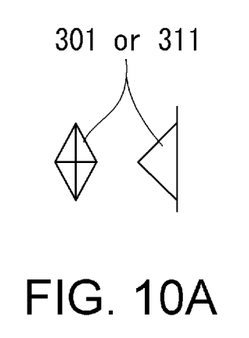
FIG. 10A and FIG. 10B illustrate other example protrusions.
Figure 10B:
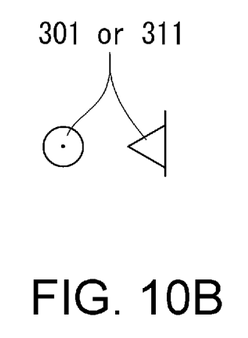

As illustrated in FIG. 5B, FIG. 7B and FIG. 10A, each of the protrusions 301/311 may have a quadrangular pyramid shape. The base of the quadrangular pyramid may be a rectangle shape (including a square shape) (FIG. 5B, FIG. 7B) or a rhomboid shape (FIG. 10A). Each of the protrusions 301/311 may have a pyramid shape other than a quadrangular pyramid. Each of the protrusions 301/311 may have a cone shape as illustrated in FIG. 10B.

Figure 10C:
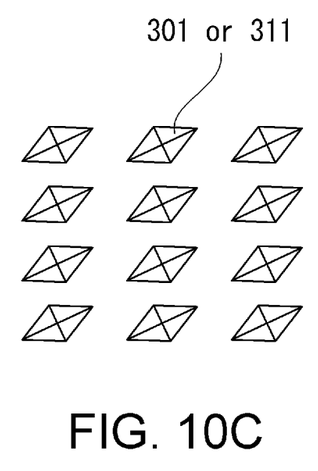
FIG. 10C and FIG. 10D illustrate other example arrays of protrusions.
Figure 10D:
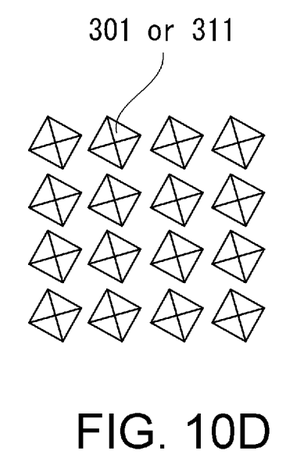

As illustrated in FIG. 5B, FIG. 7B, FIG. 10C and FIG. 10D, the protrusions 301/311 may be arrayed in a regular manner in longitudinal and lateral directions, for example, in a matrix manner. As illustrated in FIG. 10C and FIG. 10D, the protrusions 301/311 may be oriented, for example, such that the diagonal lines of the base surface of the protrusions 301/311 extend obliquely with respect to the longitudinal and lateral directions of the array of the protrusions 301/311. The plurality of protrusions 301 may have different orientations from each other, and the plurality of protrusions 311 may have different orientations from each other.

For example, the protrusions 301/311 having a flat distal end may be used instead of the pointed protrusions 301/311.

Figure 11A:
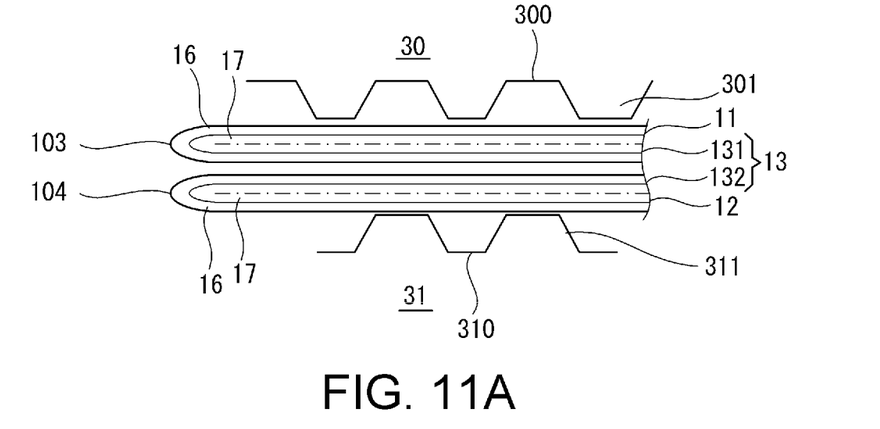
FIG. 11A to FIG. 11C illustrate another example of ultrasonic-welding.
Figure 11B:
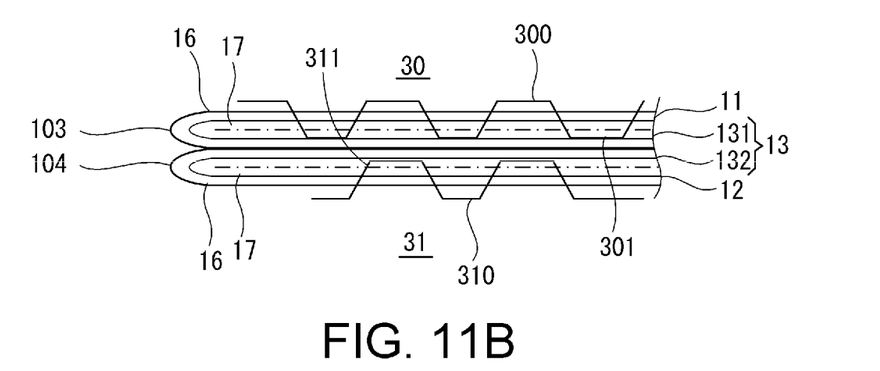
Figure 11C:
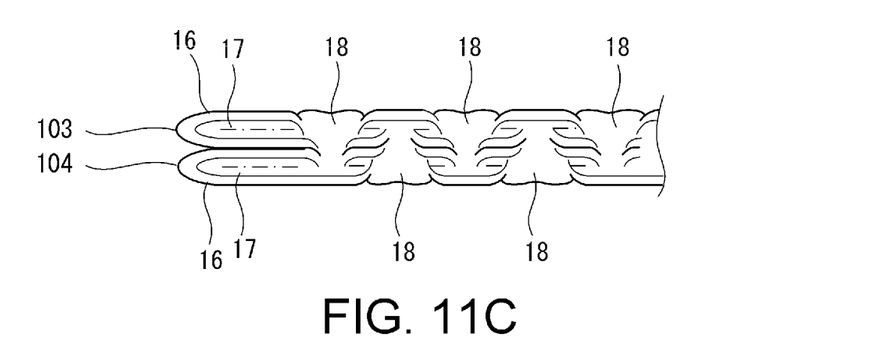

In FIG. 11A to FIG. 11C, both of the horn 30 and the anvil 31 include the protrusions 301 and 311 each having a flat distal end. As the panel parts 11 and 12 and the gusset part 13 are sandwiched and compressed by the horn 30 and the anvil 31, the protrusions 301 and 311 are sunk into the layered portion constituted by the panel parts 11 and 12 and the gusset part 13. Then, ultrasonic-welding is performed by the ultrasonic vibration of the horn 30.

This also shortens the distance between the horn 30 and the anvil 31, which allows for transferring vibrational energy efficiently and thus ultrasonic-welding the portions 131 and 132 efficiently.

Figure 12A:
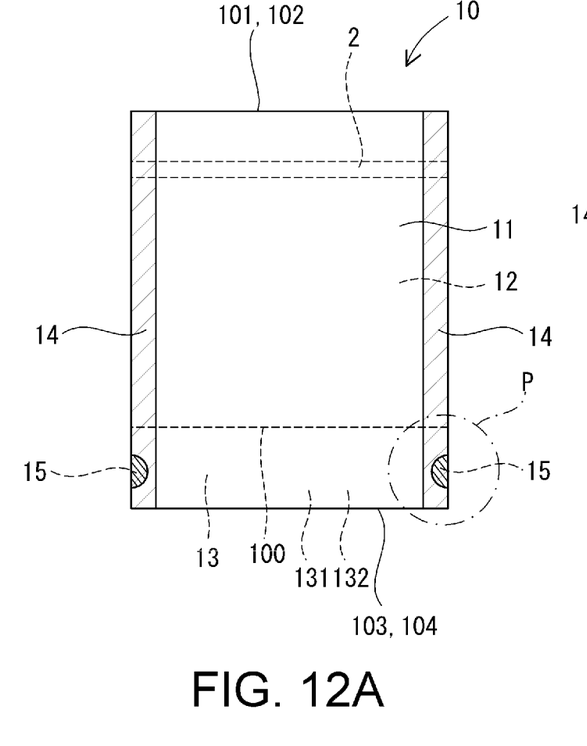
FIG. 12A is a plan view of an example bag.

FIG. 12A is a front view of the bag 10. After the shape of the bag 10 is completed by cross-cutting, a step of filling the bag 10 with contents may be performed. The self-weight of the contents in the bag 10 applies force F (FIG. 12D) which acts to separate the portions 131 and 132 of the gusset part 13 (which is a bottom gusset part) from each other at the ultrasonic-welded region 15. Regarding this force F, a component F1 in the outward direction of the bag 10 is larger than a component F2 in the vertical direction of the bag 10 as illustrated in FIG. 12B.

The ultrasonic welding between the portions 131 and 132 counteracts the force F which acts to separate the portions 131 and 132. On a section perpendicular to the direction of the component F1, the strength of the ultrasonic welding becomes higher in proportion to the rate of the welded area. In the case of the ultrasonic-welded region 15 having a semicircular shape as illustrated in FIG. 12B, the strength of the ultrasonic welding is thus higher at the position of a line M than at the position of a line L.

Figure 13A:
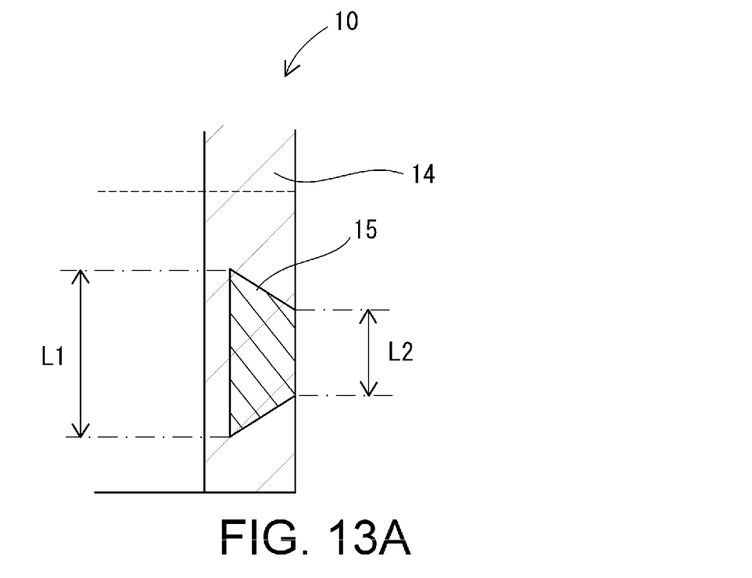
FIG. 13A illustrates an example ultrasonic-welded region in the bag.

From the viewpoint of preventing the portions 131 and 132 from being separated from each other by the force that is applied outward from the interior of the bag 10, as exemplified by the self-weight of the contents in the bag 10, it is preferable that the ultrasonic-welded region 15 of the bag 1 has a longer length L1 on the inward side thereof than a length L2 on the outward side thereof as illustrated in FIG. 13A (L1>L2). As illustrated in FIG. 13A, the ultrasonic-welded region 15 of the bag 10 may have a trapezoidal shape that narrows toward the outside of the bag.

Figure 12B:
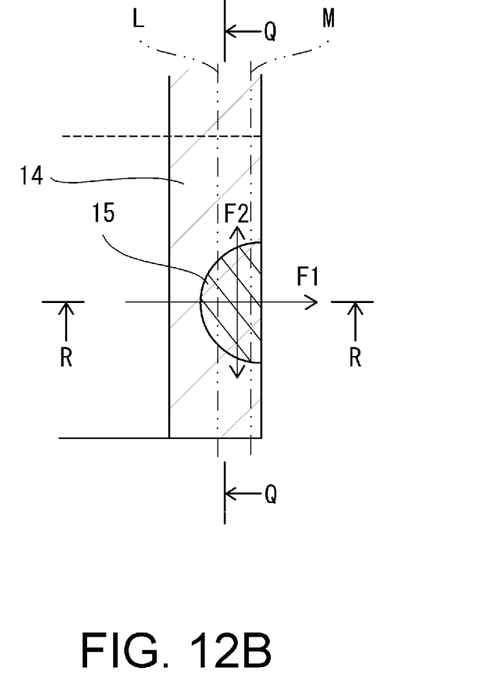
FIG. 12B is an enlarged view of a region P in FIG. 12A.
Figure 12C:
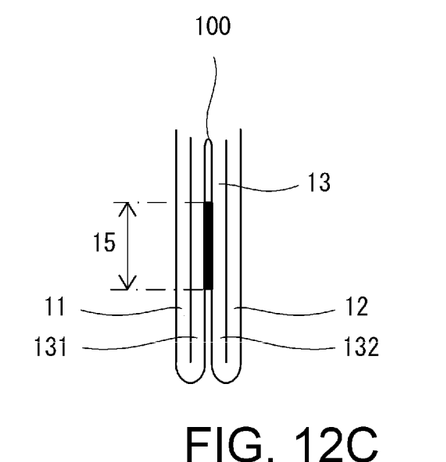
FIG. 12C is a Q-Q line sectional view of FIG. 12B.
Figure 12D:
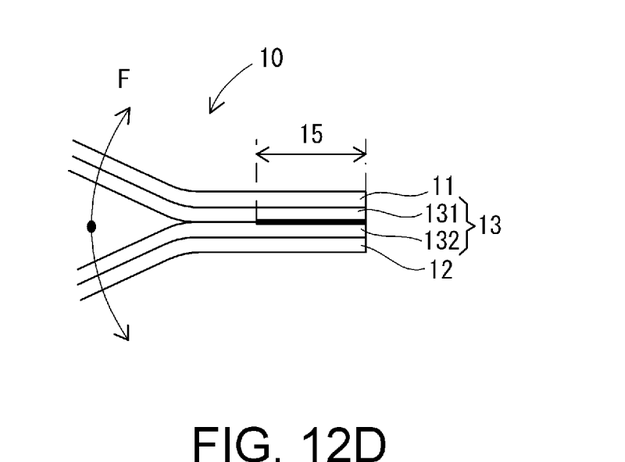
FIG. 12D is an R-R line sectional view of FIG. 12B.

For example, in the case where the ultrasonic-welded region 15 in FIG. 12B and the ultrasonic-welded region 15 in FIG. 13A have the same area, the ultrasonic-welded region 15 in FIG. 13A is stronger against the separation due to the self-weight of the contents than that in FIG. 12B.

Figure 13B:
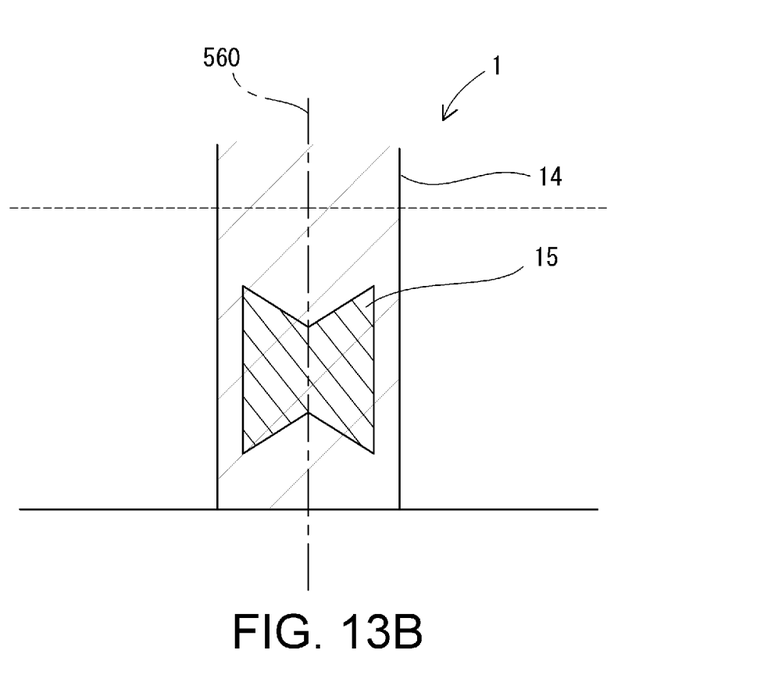
FIG. 13B illustrates an example ultrasonic-welded region in a web.

The shapes of both facing surfaces 300 and 310 of the horn 30 and the anvil 31 are determined such that the ultrasonic-welded region 15 in FIG. 13B is formed in the web 1 by the ultrasonic welding device 3 (FIG. 1A) in the bag making step. The web 1 is cross-cut at a cross-cut position 560 by the cross cut device 56 (FIG. 1A), so that the ultrasonic-welded region 15 is divided into two. Thereby, the bag 10 is made which includes the ultrasonic-welded regions 15 each having a trapezoidal shape as illustrated in FIG. 13A.

Figure 14A:
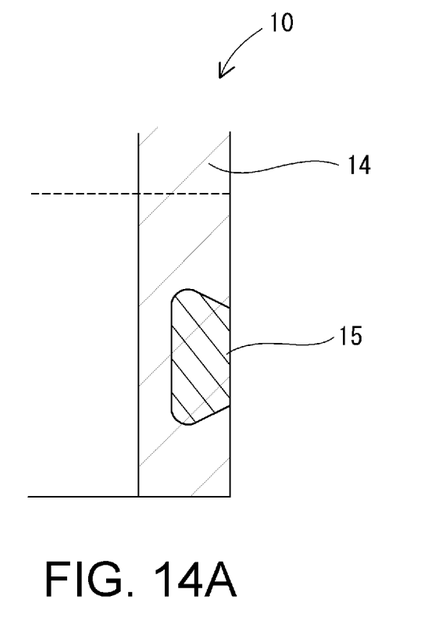
FIG. 14A and FIG. 14B illustrate yet other example ultrasonic-welded regions in the bag.
Figure 14B:
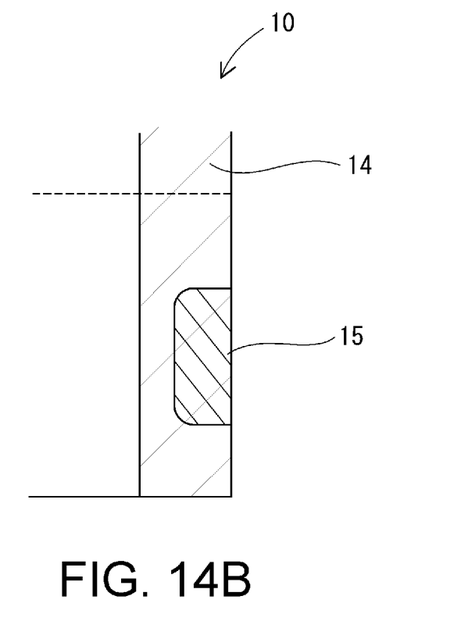

When the ultrasonic-welded region 15 has angled corners as illustrated in FIG. 13A, there is a problem that the welding may be peeled off from the angled corner. Therefore, the corner of the ultrasonic-welded region 15 may have an R-shape as illustrated in FIG. 14A and FIG. 14B. The ultrasonic-welded region 15 is not limited to a trapezoidal shape as illustrated in FIG. 14A, and may be a quadrangular shape having R-shaped corners as illustrated in FIG. 14B. The ultrasonic-welded regions 15 in FIG. 14A and FIG. 14B also may be formed by the method described with reference to FIG. 13B.

As described above, the efficiency of the ultrasonic welding is improved by the protrusions 301/311.

The welding method may be applied to the panel part 11, the panel part 12 and the gusset part 13 that are integrally formed by folding a single sheet, instead of the web 1. Also, the welding method may be applied to the panel part 11, the panel part 12 and the gusset part 13 that are separate components.

The gusset part 13 may function as a top gusset part, instead of the bottom gusset part. The welding method may be applied to a side gusset part folded and interposed between the panel parts 11 and 12 as described in Patent document 1.

As the material of the panel parts 11 and 12 and the gusset part 13, material having heat plasticity may be widely used in addition to the laminated film including the base layer 16 and the sealant layer 17 as described in the implementations. For example, mono-material suitable for recycle may be used. In addition, material that makes it possible to reduce resin disposal volume, as exemplified by material composed of a paper as a base and a resin coating the paper, may be used. Furthermore, biodegradable material may be used.

The invention claimed is:

1. A bag making method comprising:
    folding a web to form a continuous first panel part, a continuous second panel part, and a continuous gusset part from the web, the gusset part being folded and interposed between the first and second panel parts;
    sandwiching and compressing the first panel part, the second panel part, and the gusset part folded and interposed between the first and second panel parts, with a horn and an anvil, the horn having a facing surface that faces the anvil, the anvil having a facing surface that faces the horn, at least one of the horn or the anvil including protrusions that protrude from the facing surface thereof;
    ultrasonic-welding a first portion and a second portion of the gusset part to each other using ultrasonic vibration of the horn while the first panel part, the second panel part, and the gusset part are sandwiched and compressed by the horn and the anvil;
    before ultrasonic-welding the first portion and the second portion to each other with the horn and the anvil, heat-sealing the web using a seal unit including a pair of heat seal bars to soften the first panel part, the second panel part, and the gusset part, wherein the ultrasonic-welding is performed in a state in which the first panel part, the second panel part, and the gusset part are softened;
    heat-sealing an ultrasonic-welded region where the first portion and the second portion have been ultrasonic-welded to each other by the horn and the anvil, using a second seal unit including a second pair of heat seal bars, subsequent to the ultrasonic-welding; and cross-cutting the web in a width direction of the web across the ultrasonic-welded region so as to make a bag.

2. The bag making method according to claim 1, comprising providing the ultrasonic-welded region with a longer length on an inward side thereof than on an outward side thereof.

3. The bag making method according to claim 2, comprising providing the ultrasonic-welded region with a trapezoidal shape that narrows toward an outside of the bag.

4. The bag making method according to claim 1, comprising providing the bag with marks of the protrusions, the marks being generated during the ultrasonic-welding with the horn and the anvil.

5. The bag making method according to claim 1, wherein each of the protrusions has a pointed shape, and wherein the bag making method comprises thrusting the protrusions into the first or second panel part and the gusset part such that the protrusions penetrate through the first or second panel part, as the first panel part, the second panel part, and the gusset part are sandwiched and compressed by the horn and the anvil.

6. The bag making method according to claim 5, comprising thrusting the protrusions into the first panel part, the second panel part, the first portion, and the second portion such that the protrusions penetrate through the first panel part, the first portion, and the second portion, as the first panel part, the second panel part, and the gusset part are sandwiched and compressed by the horn and the anvil.

7. The bag making method according to claim 1, wherein each of the protrusions has a flat distal end, and wherein the bag making method comprises sinking the protrusions into a layered portion constituted by the first panel part, the second panel part, the first portion, and the second portion, as the first panel part, the second panel part, and the gusset part are sandwiched and compressed by the horn and the anvil.

8. The bag making method according to claim 5, wherein each of the first panel part, the second panel part, and the gusset part is a laminated film including a base layer composed of a base material and a sealant layer composed of a sealant having a lower melting point than the base material, and wherein the bag making method comprises melting the sealant using the ultrasonic vibration of the horn to integrally weld the first panel part, the second panel part, the first portion, and the second portion via the sealant.

9. The bag making method according to claim 5, wherein the protrusions are disposed on both the facing surface of the horn and the facing surface of the anvil, and
wherein the protrusions of the horn and the protrusions of the anvil are arranged so as to be offset from each other in a direction perpendicular to a facing direction of the horn and the anvil such that distal ends of the protrusions of the horn and distal ends of the protrusions of the anvil do not face each other.

\* \* \* \* \*